J. B. FIRTH.
Cake-Pans.

No. 140,619.                                  Patented July 8, 1873.

Witnesses:
A. W. Almqvist
O. Sedgwick

Inventor:
J. B. Firth
Per. [signature]
Attorneys.

UNITED STATES PATENT OFFICE.

JOHN B. FIRTH, OF BROOKLYN, NEW YORK.

IMPROVEMENT IN CAKE-PANS.

Specification forming part of Letters Patent No. 140,619, dated July 8, 1873; application filed May 24, 1873.

*To all whom it may concern:*

Figure 1:
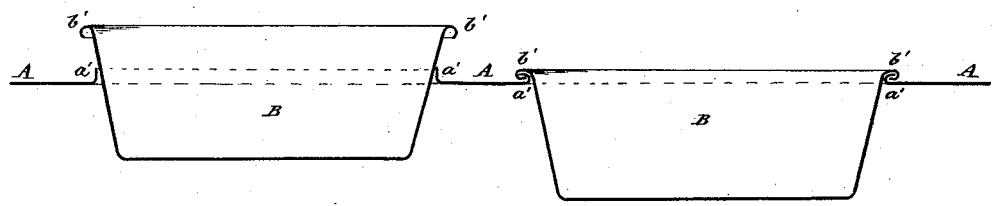
Figure 2:
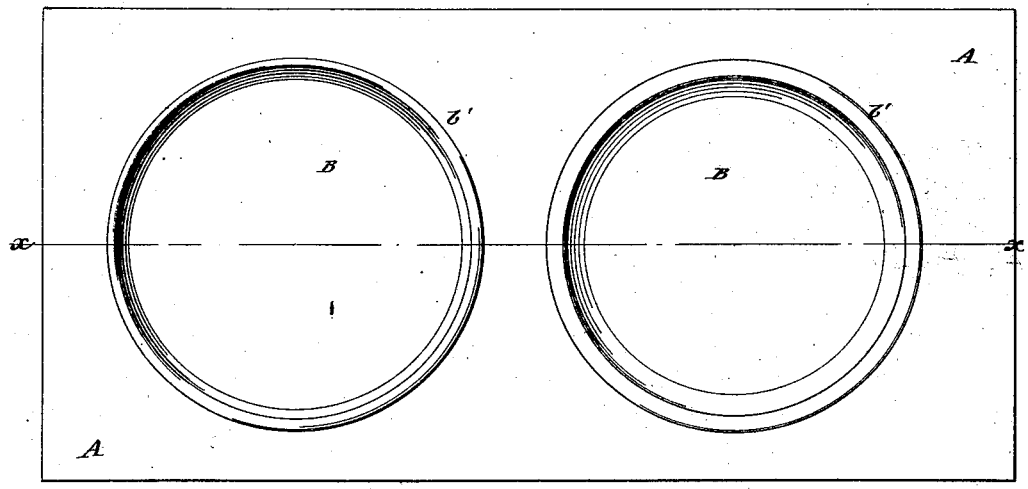

Be it known that I, JOHN B. FIRTH, of Brooklyn, in the county of Kings and State of New York, have invented a new and useful Improvement in Cake-Pans on Frames, of which the following is a specification:

Figure 1 is a detail section taken through the line $x\ x$, Fig. 2, of a frame containing two pans, one being shown as secured in place and the other as ready for securing. Fig. 2 is a top view of the same.

Similar letters of reference indicate corresponding parts.

My invention has for its object to furnish cake-pans on frames, in which the pans shall be secured in place firmly and neatly, and in such a way that they can be conveniently cleaned and washed, and that they will not be liable to become loose. The invention consists in a cluster of cake-pans secured to their frame, as hereinafter described and pointed out in the claim.

A represents the frame or plate, to which the pans B are to be secured. In the plate A are formed as many holes as it is designed to have pans B attached to it. These holes are made a little smaller than the upper part of the pans B, and are formed with an upwardly-projecting burr or narrow flange, $a'$, as shown in Fig. 1. The pans B are formed with their edges $b'$ turned over, as shown in Fig. 1, but not closed down.

As thus prepared, the pans B are placed in the holes of the frame A, and are pressed down into said holes. As the pans B are pressed down the flange $a'$ enters the cavity of the flange $b'$, and is forced outward, so that the said flange $b'$ may enfold its edge, and the two flanges are closed down upon each other and upon the body of the frame A, the pans B being thus double-seamed to the frame A.

Having thus described my invention, I claim as new and desire to secure by Letters Patent—

The cluster of cake-pans B, connected to the frame A by the flanges $a'$ and turned edges $b'$, as and for the purpose described.

JOHN B. FIRTH.

Witnesses:
 JAMES T. GRAHAM,
 T. B. MOSHER.